United States Patent
Kumar et al.

(10) Patent No.: US 7,283,533 B1
(45) Date of Patent: Oct. 16, 2007

(54) INTERWORKING OF PACKET-BASED VOICE TECHNOLOGIES USING VIRTUAL TDM TRUNKS

(75) Inventors: Rajesh Kumar, Fremont, CA (US); David Hughes, Palo Alto, CA (US); Mohammed Mostafa, Emerald Hills, CA (US); John Ellis, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1538 days.

(21) Appl. No.: 09/892,117

(22) Filed: Jun. 25, 2001

(51) Int. Cl.
*H04L 12/28* (2006.01)
*H04J 3/16* (2006.01)

(52) U.S. Cl. .................. 370/395.52; 370/466
(58) Field of Classification Search ........... 370/352, 370/356, 395.52, 395.61, 401, 466, 467
See application file for complete search history.

(56) References Cited

U.S. PATENT DOCUMENTS

| | | | |
|---|---|---|---|
| 6,385,195 B2 * | 5/2002 | Sicher et al. ............... | 370/356 |
| 6,519,261 B1 * | 2/2003 | Brueckheimer et al. ............... | 370/395.52 |
| 6,603,774 B1 * | 8/2003 | Knappe et al. .............. | 370/466 |
| 6,628,617 B1 * | 9/2003 | Karol et al. ................ | 370/237 |
| 6,741,585 B1 * | 5/2004 | Munoz et al. .............. | 370/352 |
| 6,801,542 B1 * | 10/2004 | Subbiah ...................... | 370/467 |

* cited by examiner

*Primary Examiner*—Chau Nguyen
*Assistant Examiner*—Andrew Wahba
(74) *Attorney, Agent, or Firm*—Blakely, Sokoloff, Taylor & Zafman LLP

(57) ABSTRACT

A method for directly converting packet-based voice data of two non-compatible formats, (e.g., VoIP and VOATM), is described. A VoIP call agent sets a connection between a VoIP edge gateway and an interworking unit (IWU). The IWU allows the VoATM network to appear as a TDM network to the VoIP call agent. The VoIP call agent selects a virtual trunk group and channel identification code through the interworking unit and transmits the selection to a VoATM call agent. The IWU allows the VoIP network to appear as a TDM network to the VoATM call agent such that the VoATM call agent establishes a connection between the virtual trunk group and a VoATM network device. The IWU allows the VoATM network to appear as a TDM network to the VoIP call agent such that the VoIP call agent establishes a connection between the virtual trunk group and a VoIP network device.

24 Claims, 5 Drawing Sheets

INTERWORKING OF PACKET-BASED VOICE TECHNOLOGIES USING VIRTUAL TDM TRUNKS

FIELD OF THE INVENTION

The present invention relates generally to packet-based telephony, and in particular to apparatuses and methods for the interworking of two or more non-compatible packet-based voice technologies.

BACKGROUND OF THE INVENTION

Telephone carriers are deploying various packet-based voice technologies such as Real-time Transport Protocol/Internet Protocol (RTP/IP) and Asynchronous Transfer Mode (ATM). These technologies do not interwork seamlessly. Currently deployed call agents, software systems that establish the connections between packet-based voice technologies and other formats, do not have the capability to convert different types of packet-based data. Two different types of packet-based voice technologies, for example VoIP and VoATM can be made to interwork with each other with a public switched telephone network (PSTN) between them. However, the PSTN middleman necessitates costly and inefficient conversion into outdated time division multiplexing (TDM) format and thence to another packet-based format. This lack of interworking is at the bearer and control levels. As a result, there are various, pioneering packet "islands" that use the outdated, PSTN as the glue, thereby annulling the advantages of packet-based voice technology over large geographical areas. Using the PSTN also incurs signal degradation because the PSTN uses only non-compressed voice signals. Packet networks may use compressed signals that need to be converted into non-compressed format and then converted back into compressed format.

FIG. 1 is a block diagram depicting a typical conversion from an IP network to an ATM network. In the telecommunications network 100 shown in FIG. 1, telephonic data is received at voice over IP (VoIP) edge gateway 102. This data may be received from individual telephones, a private telephone network such as a private branch exchange (PBX), a data modem, or a fax machine, among others. Edge gateway 102 is a combination of software and hardware that bridges the gap between the telephone network and the IP network. Edge gateway 102 may be integrated into the telephone or PBX. The telephonic data is then routed over IP network 104 to trunk gateway 106. Establishment of the connection between the VoIP edge gateway 102 and trunk gateway 106 is controlled by one, or more, call agents 108. The call agent 108 establishes the IP session between the VoIP edge gateway 102 and the trunk gateway 106, and coordinates the conversion of data from IP format to TDM format. The data is transmitted over TDM trunk lines 109 to a network of PSTN switches 110. The TDM trunk lines may be, for example, T1 lines. The data is now transmitted over TDM trunk lines 111 to trunk gateway 112. The connection between the trunk gateway 112 and the voice over ATM (VoATM) edge gateway 116 is controlled by one, or more, call agents 118. Further, call agents 108 and 118 can communicate with each other and with the PSTN switches through an SS7 control network. The call agent 118 initiates the establishment of an ATM connection, and coordinates the conversion of data from TDM format to ATM format. The data is routed through ATM network 114 to VoATM edge gateway 116. From VoATM gateway 116 the telephonic data is transmitted to its destination telephone or PBX, for example.

The routing of packet-based voice data through a PSTN defeats one of the advantages of packet-based voice transmission, which is that the voice data can be compressed, thereby reducing bandwidth and cost. No such voice compression is possible in a PSTN; the telephonic data must be decompressed upon entering the PSTN and, recompressed upon exiting the PSTN. By routing VoIP data through a PSTN to an ATM network, this major advantage of packet-based voice technology is negated.

SUMMARY OF THE INVENTION

A method is described for converting packet-based voice data of a first format directly to packet-based voice data of a second format. Data from two networks using non-compatible packet-based voice technologies, for example VoIP and VoATM, is interworked for direct conversion. The method comprises setting a connection between a VoIP edge gateway and an interworking unit (IWU). The IWU comprises a virtual TDM network. A virtual trunk group and channel identification code are then selected through the interworking unit. The selection is transmitted to the VoIP and VoATM call agents. The VoIP and VoATM call agents establish connections between the virtual trunk group and the VoIP and VoATM edge gateways, respectively.

Other features and advantages of the present invention will be apparent from the accompanying drawings, and from the detailed description, which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An embodiment of the present invention will provide a simple method of interworking VoIP data with VoATM data. This is accomplished without compromising the performance and robustness of the already complex call handling software by implementing a VoIP-VoATM interworking unit (IWU) that appears as a set of virtual TDM trunks to both the IP side and the ATM side. Call control software on the IP or ATM side of the boundary is fooled into thinking that the other side consists of TDM Inter-machine trunks (IMTs). To call control software, the IWU appears as a normal PSTN trunk gateway. The complexities of converting the control representations as well as the bearer packet formats reside in the IWU. These complexities are hidden from call control software and from the rest of the bearer network.

In one embodiment the ATM data is ATM Adaptation Layer Type 2 (AAL-2) data. In one embodiment the IWU is a single unit that is located between an IP edge network and an AAL2 core network. In an alternative embodiment the IWU is a single unit located between an IP edge network and an ATM core network, controlled by a private network-to-network interface (PNNI). Alternatively the IWU could be located between two peer networks.

An intended advantage of one embodiment of the present invention is to provide user-transparent end-to-end code/profile negotiation that spans the IP and ATM networks. Another intended advantage of one embodiment of the present invention is to provide the ability to access an adjacent packet network that uses a different technology (e.g., IP, ATM/PNNI, ATM/AAL2) without additional complexity to call control software in call agents (i.e., not require the call agent software to be aware of the IP to ATM conversion) and in media gateways (e.g., negotiate the connection parameters as if this were an homogeneous packet network). Another intended advantage of one embodiment of the present invention is to provide the ability to interwork various packet-based voice technologies without recourse to legacy communication networks (e.g., PSTN).

Figure 2:
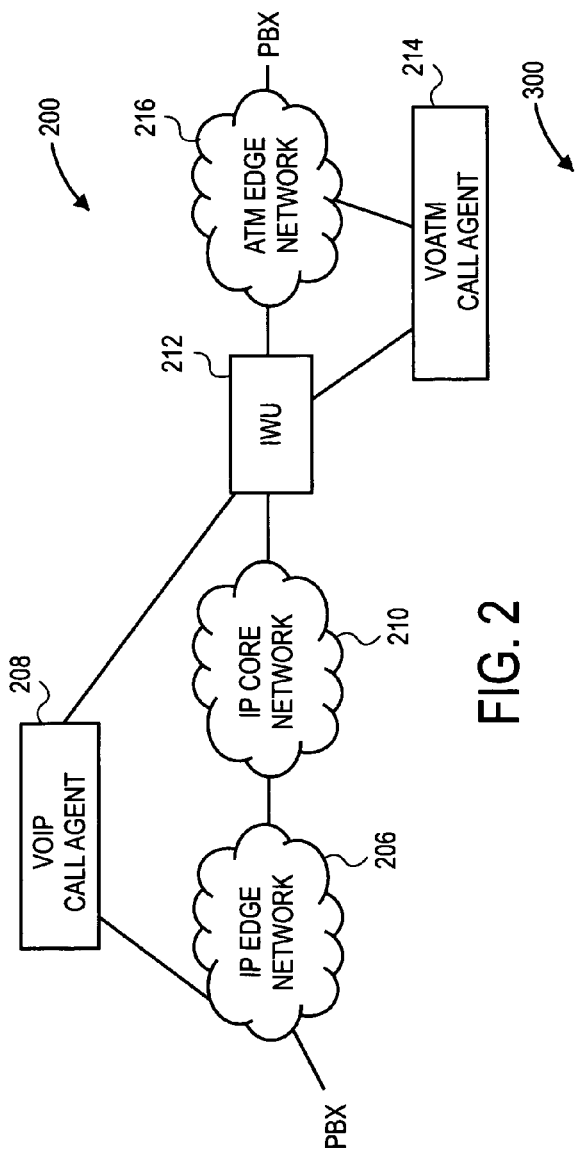
FIGS. 2 and 3 are block diagrams depicting the conversion of IP data to ATM data in accordance with the present invention.
Figure 3:
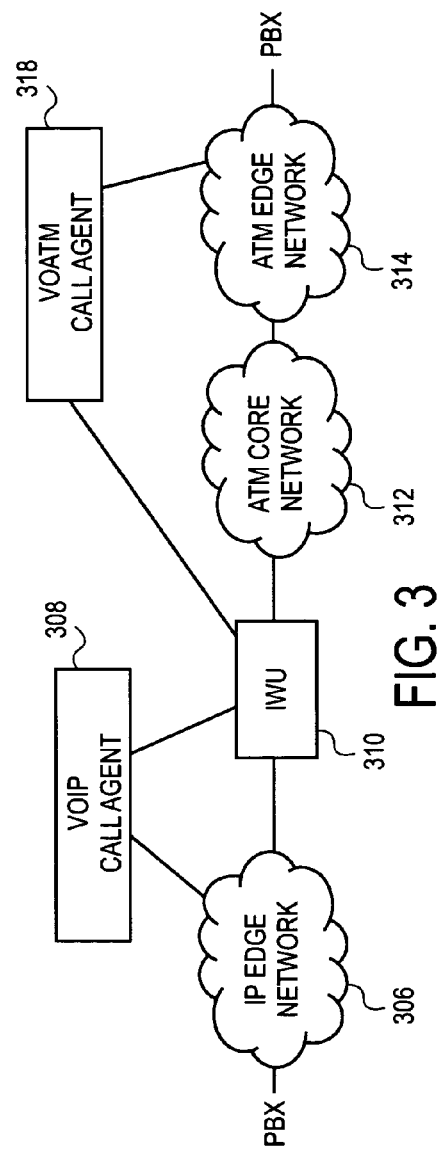

FIGS. 2 and 3 are block diagrams depicting the conversion of IP data to ATM data in accordance with the present invention. In the telecommunications system 200 shown in FIG. 2 telephonic data from, for example, a PBX, is received at a VoIP edge device of IP edge network 206. The data is then routed over IP core network 210 to interworking unit (IWU) 212. IWU 212 is a hardware/software device encapsulating the IP-ATM conversion functionality. IWU 212 is described in greater detail below.

From the perspective of the VoIP call agent 208, the IWU appears as a PSTN, so VoIP call agent 208 proceeds with call control and call establishment as if the IWU were a PSTN. The call agent 208 perceives a conversion of the data from IP format to TDM format. The VoATM call agent 214 perceives a conversion of data from TDM format to ATM format. Conversion of the data to and from TDM format does not take place, instead the data is converted from IP data directly to ATM data. The data is then transmitted to an ATM edge device of ATM edge network 216 where it is transmitted to its destination, for example, a PBX.

FIG. 3 is a block diagram depicting the conversion of IP data to ATM data in accordance with an alternate embodiment of the present invention in which the IP-ATM data conversion takes place between an IP edge network and an ATM core network.

Figure 1:
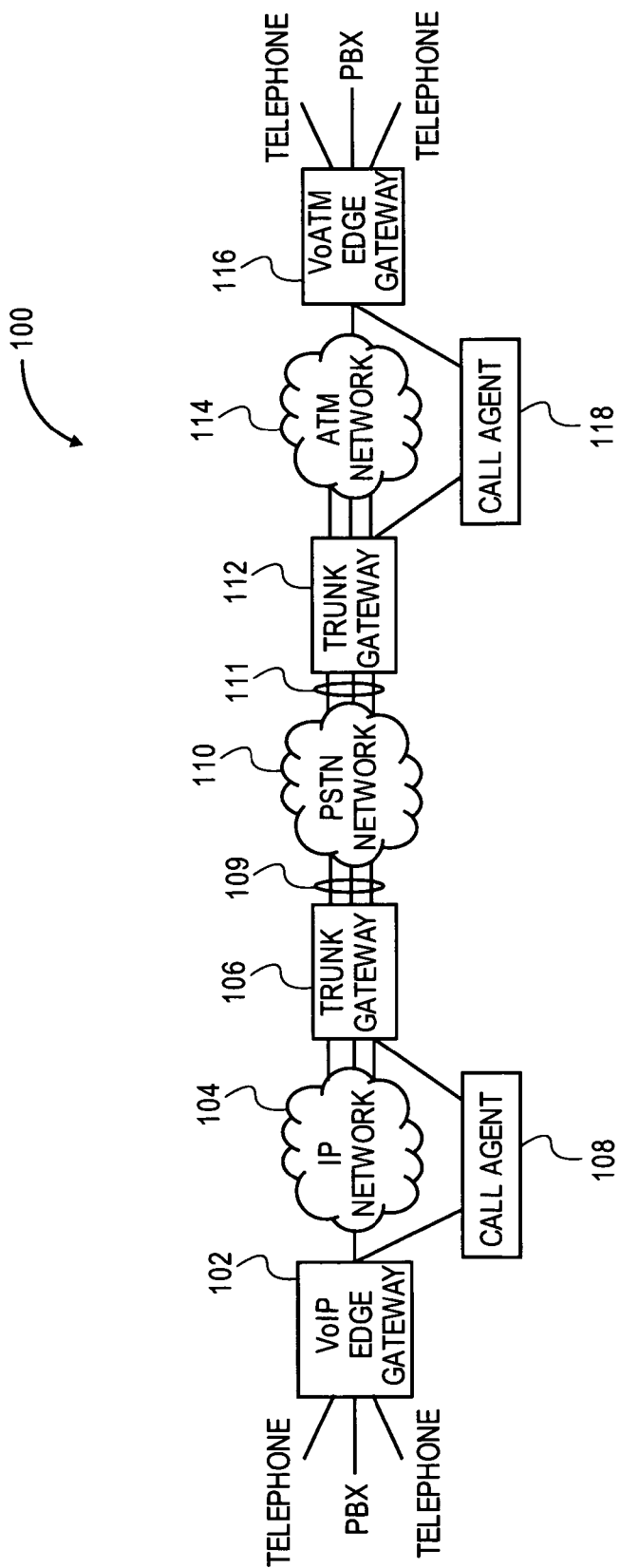
FIG. 1 is a block diagram depicting a typical conversion from an IP network to an ATM network in accordance with the prior art.
Figure 4:
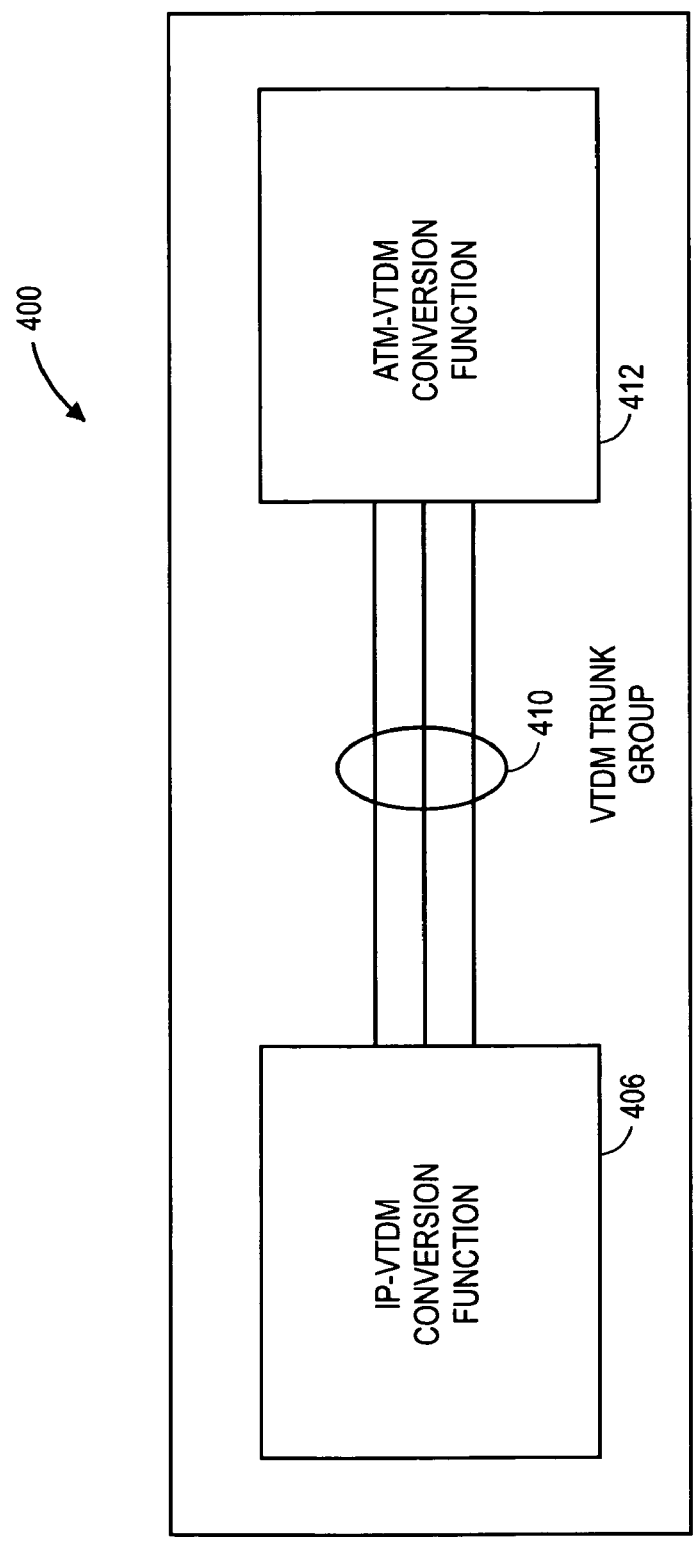
FIG. 4 is a block diagram of an IWU in accordance with the present invention.

FIG. 4 is a simplified block diagram of an IWU in accordance with the present invention. The IWU 400, shown in FIG. 4, has the equivalent functionality of two trunk gateways and a PSTN. Internet Protocol-Virtual Time Division Multiplex (IP-VTDM) conversion function 406 is the functional equivalent of trunk gateway 106 of FIG. 1. The VTDM trunk group is not a real TDM (i.e., not a physical wire), but is mapping information stored in a connection memory. VTDM trunk group 410 is the functional equivalent of the PSTN 110. The virtual trunks are associated with RTP sessions in the VoIP domain and with ATM connections in the ATM domain. The Asynchronous Transfer Mode-Virtual Time Division Multiplex (ATM-VTDM) conversion function 412 is the functional equivalent of trunk gateway 112. The VoIP call agent and the VoATM call agent do not require an IP-ATM conversion capability. IWU 400 converts IP directly to ATM, or vice versa, while the respective call agents view the conversion as though there was an intermediate TDM conversion. Although the VoIP and VoATM call agents see real TDM trunks going out to the other side and address them as IMT channel identification codes (CICs), these trunks are virtual and represent bearer format conversion resources (RTP/IP to ATM or RTP/IP to AAL2/ATM) in the IWU.

Figure 5:
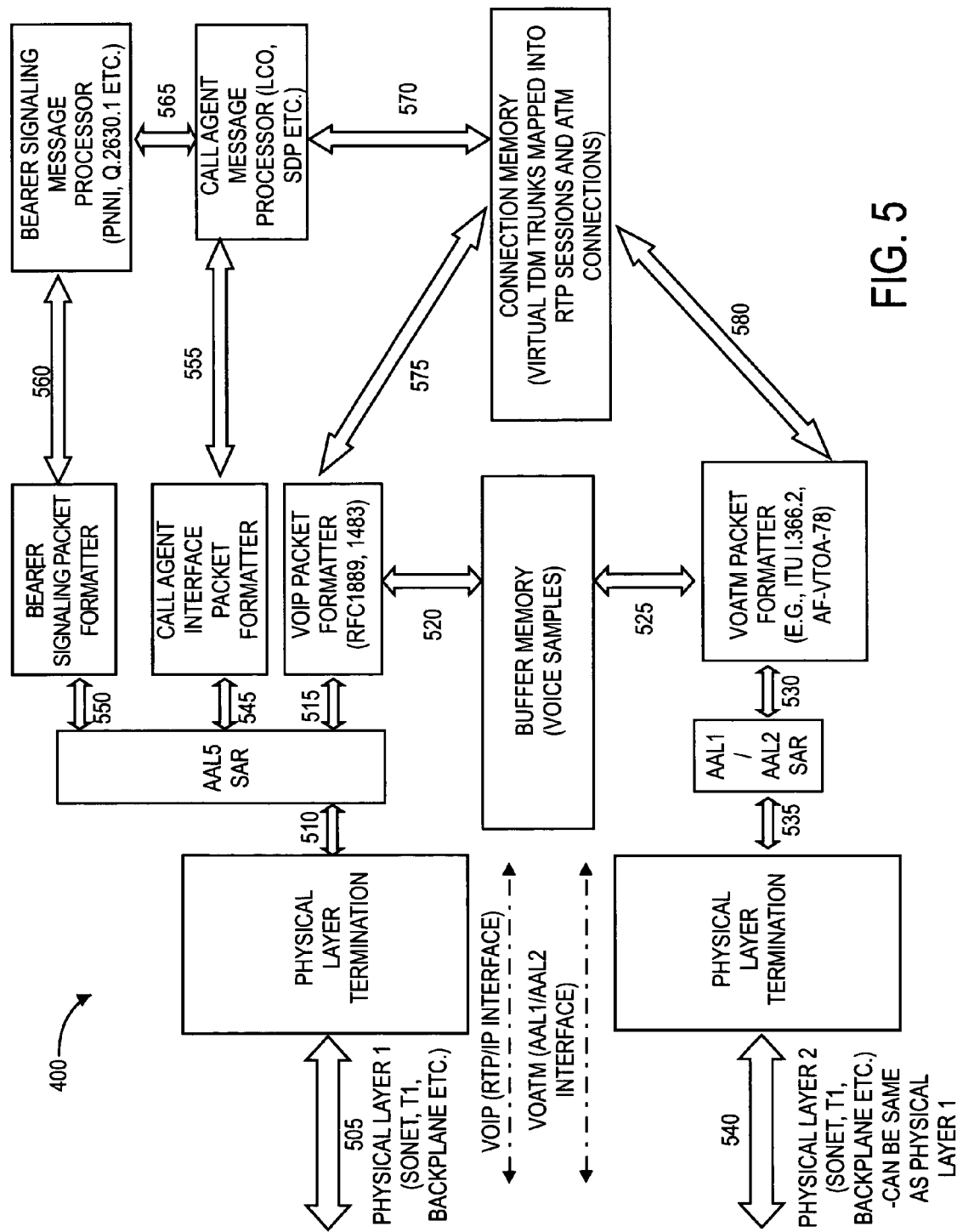
FIG. 5 illustrates the functionality of an IWU in accordance with one embodiment of the present invention.

The IWU 400 described above in reference to FIG. 4 is discussed more fully below in reference to FIG. 5. FIG. 5 illustrates the functionality of an IWU in accordance with one embodiment. The conversion of VoIP to Vo ATM begins at operation 505 in which voice data is received as VoIP at the physical layer. The physical layer may be, for example, synchronous optical network data (SONET). The AAL-5 data is extracted from the VoIP data at operation 510. From this data, the bearer signaling information is extracted at operation 550, the call agent information is extracted at operation 545, and the VoRTP information is extracted at operation 515. At operation 520, the voice samples are extracted from the VoRTP information and stored to buffer memory. At operation 525 the voice samples are formatted as AAL-1 or AAL-2 PDUs The formatting may be accomplished in accordance with ATM Forum—Voice and Telephony over ATM specification 78 for AAL-1 data, and International Telecommunications Union specification 1.366.2 for AAL-2 data. At operation 530 the data is reformatted as ATM cells. At operation 535 the ATM cells are used to create a VoATM data stream, and at operation 540 the VoATM data is output to the appropriate physical layer (e.g., SONET).

The call agent information that contains the media gateway control protocol (MGCP) and session description protocol (SDP) is forwarded to the call agent message processor at operation 555. The call agent message processor interfaces to the VoIP call agent and to the VoATM call agent. The call agent message processor interprets the SDP and processes the information to convert the SDP into a form that can be used by the VoATM call agent. The call agent message processor extracts the identifying information such as port number and virtual circuit identifier (VCI). The identifying information is stored in the form of associations between the virtual trunks and the RTP ports on the IP side at operation 570. This information controls how the RTP streams flow into the VoATM streams. Analogously, on the ATM side, the information is stored between the virtual trunks and the ATM circuits and controls how particular VoATM streams flow into VoIP streams.

At operation 560, the bearer signaling information, extracted from the AAL-5 data at operation 550, is forwarded to the bearer signaling message processor. Based on the MGCP and the SDP messages, a bearer path, for example, a switched virtual circuit (SVC), or an AAL-2 path, is established. When the path is established a status indication is sent. The bearer signaling is described in more detail, below, in reference to FIG. 6.

The conversion of VoATM to VoIP is accomplished in a similar fashion. The conversion of VoATM to VoIP, begins in IWU 400 at the lowest protocol layer that is, the physical layer, at operation 540. The physical layer may be, for example, synchronous optical network data (SONET). The voice data enters as VoATM that may be ATM adaptation layer 1 (AAL-1) for constant bit rate data, or AAL-2 for variable bit rate data. At operation 535 the data is segmented as AAL-1 or AAL-2. At operation 530 the AAL-1 or AAL-2 protocol data units (PDUs) are extracted. For AAL-1 data the PDU extraction may be accomplished in accordance with ATM Forum—Voice and Telephony over ATM specification 78. For AAL-2 data the PDU extraction may be accomplished in accordance with International Telecommunications Union specification 1.366.2. Voice samples are then extracted from the PDUs and stored in buffer memory at operation 525.

The ATM control data flow information is mapped into connection memory at operation 580. At 520 the voice samples are read from buffer memory and reformatted as RTP over IP. The control data flow information is forwarded to the VoIP packet formatter at operation 575. At operation 515 the data is segmented in the form of ATM cells and formatted as AAL-5. At operation 510 the cells are formatted as VoIP data and at operation 505 the VoIP data is transmitted over the appropriate physical layer.

Figure 6:
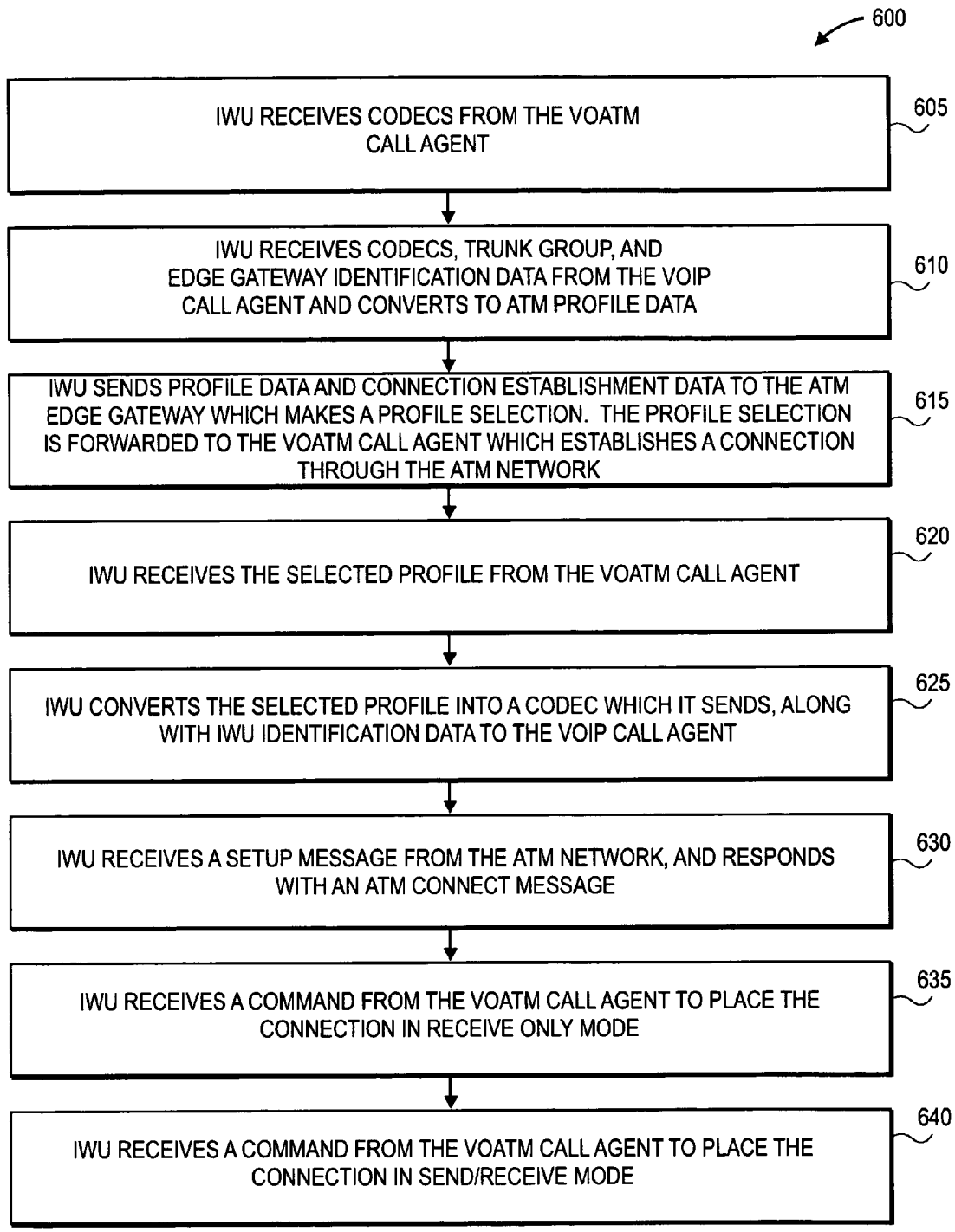
FIG. 6 is a process flow diagram according to one embodiment of the present invention.

The following describes a VoIP-VoATM call set-up using an ATM core network as shown in FIG. 3. Depending on the signaling format used by the PBX, the IP edge gateway forwards a set-up message from the PBX to the VoIP call agent, or sends event notifications indicating off-hook status and the dialed number. On the basis of the dialed number, the VoIP call agent determines that it is necessary to use the VoATM call agent in routing the call. The VoIP call agent determines the IWU to be used, and the virtual trunk group number and CIC to be associated with this call. The VoIP call agent communicates this information to the VoATM call agent and sends a connection establishment command to the VoIP edge gateway. The connection establishment command contains a list of coder-decoders (codecs) encapsulated in local connection options (LCOs). The list of codecs represents available encoding schemes that may involve compression/decompression. The IP edge gateway chooses one or more of the alternatives, provided in the LCO, and encapsulates that information in a SDP descriptor. Within this descriptor, the IP edge gateway also includes its identification information including its own IP address and IP port number at which the connection should be established. This information is sent to the VoIP call agent. The process is described from this point forward by FIG. 6. FIG. 6 is a process flow diagram according to one embodiment of the present invention. Process 600, shown in FIG. 6, begins at operation 605 in which the IWU receives a local connections option (LCO) from the VoATM call agent. The LCO contains, among other information, a list of AAL2 profiles containing codec information, and the virtual trunk group number and CIC that the VoATM call agent received from the VoIP call agent. At operation 610 the IWU receives codecs from the VoIP call agent along with the virtual trunk group number and CIC, the IP address of the VoIP edge gateway, and the RTP port number to be used at the edge gateway. As noted above, the codec information, received from the call agent, is encapsulated in two data structures, a LCO data structure, which refers to the preferences of the call agent, and a SDP, which refers to the preferences of the edge gateway. At the control level, SDP descriptions for the IP and ATM networks are different (e.g., parameters such as AAL2 profiles versus RTP/AVP payload types), and are converted by the IWU during the process of connection establishment. The IWU constructs a composite SDP descriptor from the two sets of data, from the VoIP and VoAAL2 call agents. While constructing the SDP descriptor, the IWU harmonizes the various sets of codec data and translates the result into a set of AAL2 profiles. Within the composite SDP descriptor, the IWU includes its own ATM address and a four-octet value called the Backbone Network Connection Identifier (BNC-ID). The BNC-ID is used to identify the VoATM network connection.

At operation 615 the IWU sends the composite SDP descriptor to the VoATM call agent that forwards it to the VoATM edge gateway. As described above, this composite SDP descriptor contains a set of AAL2 profiles, the ATM address of the IWU, and the BNC-ID selected by the IWU. The VoATM call agent also provides the VoATM edge gateway with a LCO containing its preferred list of AAL2 profiles containing codec information. The ATM edge gateway makes a profile selection, which is forwarded to the VoATM call agent. The VoATM initiates the establishment of a connection through the VoATM network to the IWU. This could be via SVC signaling, for example, ATMF PNNI, or could be via AAL2 signaling, for example, ITU Q.2630.1. The BNC-ID is carried within this signaling to the IWU.

At operation 620 the IWU receives the selected profile information from the VoATM call agent. The IWU extracts a codec and a packetization period from the selected profile for use by the IP edge gateway. At operation 625, this data is sent to the VoIP call agent that forwards it to the VoIP edge gateway. Included with this data, the IWU sends its own identification data (i.e., the IWU IP address and IP port number). This is the address and port number to which data will be sent by the IWU.

At operation 630 the IWU receives a set-up message from the ATM network with the connection establishment data, including the BNC-ID that the IWU sent at operation 615. The IWU uses the BNC-ID to correlate the virtual trunk selected for the call with the ATM connection. In response to the set-up message, the IWU sends an acknowledgement message to the ATM edge gateway. The acknowledgement message could be an ATM connect message or an establish confirmation message.

At operation 635 the IWU receives a command from the VoATM call agent to place the connection in receive-only mode. At operation 640 the IWU receives a command from the VoATM call agent to place the connection in send/receive mode. At this point end-to-end connection set-up via the VoIP and VoATM networks has taken place.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    setting a connection between an edge gateway of a first voice packet network and an interworking unit, the interworking unit comprising a virtual time division multiplex network;
    selecting a virtual trunk group and channel identification code through the interworking unit; and
    transmitting the selection to a call agent of a second voice packet network, the second voice packet network not of the same type as the first voice packet network, such that the call agent of the second voice packet network coordinates the establishment of a connection between the virtual trunk group and an edge gateway of the second voice packet network.

2. The method of claim 1, wherein the second voice packet network is a voice over asynchronous transfer mode adaption layer 2 network.

3. The method of claim 2, wherein the voice over asynchronous transfer mode network is a PNNI-controlled SVC network.

4. The method of claim 2, wherein the edge gateway of the first voice packet network is a real time protocol/internet protocol edge gateway.

5. The method of claim 4, wherein the interworking unit is between a voice over internet protocol edge network and a voice over asynchronous transfer mode core network.

6. The method of claim 1, wherein the interworking unit is between a voice over internet protocol core network and a voice over asynchronous transfer mode edge network.

7. A machine readable medium that provides executable instructions, which when executed by a processor, cause said processor to perform a method comprising:
setting a connection between an edge gateway of a first voice packet network and an interworking unit, the interworking unit comprising a virtual time division multiplex network;
selecting a virtual trunk group and channel identification code through the interworking unit; and
transmitting the selection to a call agent of a second voice packet network, the second voice packet network not of the same type as the first voice packet network, such that the call agent of the second voice packet network coordinates the establishment of a connection between the virtual trunk group and an edge gateway of the second voice packet network.

8. The machine-readable medium of claim 7, wherein the voice packet network is a voice over asynchronous transfer mode adaption layer 2 network.

9. The machine readable medium of claim 8, wherein the voice over asynchronous transfer mode network is a PNNI-controlled SVC network.

10. The machine-readable medium of claim 8, wherein the edge gateway of the first voice packet network is a real time protocol/internet protocol edge gateway.

11. The machine-readable medium of claim 10, wherein the interworking unit is between a voice over internet protocol edge network and a voice over asynchronous transfer mode core network.

12. The machine-readable medium of claim 7, wherein the interworking unit is between a voice over internet protocol core network and a voice over asynchronous transfer mode edge network.

13. An apparatus comprising:
means for setting a connection between an edge gateway of a first voice packet network and an interworking unit, the interworking unit comprising a virtual time division multiplex network;
means for selecting a virtual trunk group and channel identification code through the interworking unit; and
means for transmitting the selection to a call agent of a second voice packet network, the second voice packet network not of the same type as the first voice packet network, such that the call agent of the second voice packet network coordinates the establishment of a connection between the virtual trunk group and an edge gateway of the second voice packet network.

14. The apparatus of claim 13, wherein the second voice packet network is a voice over asynchronous transfer mode adaption layer 2 network.

15. The apparatus of claim 14, wherein the voice over asynchronous transfer mode network is a PNNI-controlled SVC network.

16. The apparatus of claim 14, wherein the edge gateway of the first voice packet network is a real time protocol/internet protocol edge gateway.

17. The apparatus of claim 16, wherein the interworking unit is between a voice over internet protocol edge network and a voice over asynchronous transfer mode core network.

18. The apparatus of claim 13, wherein the interworking unit is between a voice over internet protocol core network and a voice over asynchronous transfer mode edge network.

19. An apparatus comprising:
an edge gateway of a first voice packet network to set a connection between the edge gateway and an interworking unit, the interworking unit comprising a virtual time division multiplex network; and
a call agent of a first voice packet network to select a virtual trunk group and channel identification code through the interworking unit and transmit the selection to a call agent of a second voice packet network, such that the call agent of the second voice packet network coordinates the establishment of a connection between the virtual trunk group and an network edge gateway of the second voice packet network.

20. The apparatus of claim 19, wherein the second voice packet network is a voice over asynchronous transfer mode adaption layer 2 network.

21. The apparatus of claim 20, wherein the voice over asynchronous transfer mode network is a PNNI-controlled SVC network.

22. The apparatus of claim 20, wherein the edge gateway of the first voice packet network is a real time protocol/internet protocol edge gateway.

23. The apparatus of claim 22, wherein the interworking unit is between a voice over internet protocol edge network and a voice over asynchronous transfer mode core network.

24. The apparatus of claim 19, wherein the interworking unit is between a voice over internet protocol core network and a voice over asynchronous transfer mode edge network.

* * * * *